US012432126B2

(12) United States Patent
Li

(10) Patent No.: US 12,432,126 B2
(45) Date of Patent: Sep. 30, 2025

(54) METHOD AND APPARATUS FOR SERVICE MANAGEMENT

(71) Applicant: Telefonaktiebolaget LM Ericsson (publ), Stockholm (SE)

(72) Inventor: Peng Li, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/642,415

(22) PCT Filed: Sep. 9, 2020

(86) PCT No.: PCT/CN2020/114262
§ 371 (c)(1),
(2) Date: Mar. 11, 2022

(87) PCT Pub. No.: WO2021/047554
PCT Pub. Date: Mar. 18, 2021

(65) Prior Publication Data
US 2022/0345379 A1 Oct. 27, 2022

(30) Foreign Application Priority Data
Sep. 12, 2019 (WO) ............... PCT/CN2019/105744

(51) Int. Cl.
H04L 41/5054 (2022.01)
H04L 67/56 (2022.01)
H04L 67/63 (2022.01)
(52) U.S. Cl.
CPC .......... H04L 41/5054 (2013.01); H04L 67/56 (2022.05); H04L 67/63 (2022.05)

(58) Field of Classification Search
CPC ..... H04L 41/5054; H04L 67/56; H04L 67/63; H04L 67/51; H04L 67/561;
(Continued)

(56) References Cited
U.S. PATENT DOCUMENTS

2007/0124475 A1* 5/2007 Syed ................ H04L 67/56 709/226
2019/0140972 A1* 5/2019 Xu ................ H04L 47/70
2021/0377097 A1* 12/2021 Wang ............... H04L 67/1014

FOREIGN PATENT DOCUMENTS

CN 106817236 A 6/2017
EP 3 668 013 A1 6/2020

OTHER PUBLICATIONS

International Search Report and Written Opinion issued in International Application No. PCT/CN2020/114262, dated Dec. 8, 2020 (9 pages).

(Continued)

Primary Examiner — Joe Chacko
(74) Attorney, Agent, or Firm — Sage Patent Group

(57) ABSTRACT

Embodiments of the present disclosure provide methods and apparatuses for service management. A method at a service communication proxy (SCP) comprises receiving a first request for creating a service entry, wherein the first request includes at least one parameter to build the service entry context. The method further comprises creating the service entry based on the parameters in the first request. The method further comprises applying the service entry to process a service request from a network function (NF) consumer.

20 Claims, 7 Drawing Sheets

(58) Field of Classification Search
CPC ............... H04L 41/0668; H04L 43/065; H04L 43/0817; H04L 41/5051; H04L 41/5058; H04L 67/04
See application file for complete search history.

(56) References Cited

OTHER PUBLICATIONS

Nokia et al., "NF Set and NF Service Set—Open items resolution", 3GPP TSG-SA2 Meeting #132, S2-1903665, Xi'an, China, Apr. 2019 (6 pages).
NTT Docomo, "Resolving Editor's Note on NF Service Set", 3GPP TSG-SA2 Meeting #132, S2-1902960, Xi'an, China, Apr. 2019 (11 pages).
Ericsson, "NF Set and NF Service Set way forward", 3GPP TSG-SA WG2 Meeting #131, S2-1901585, Santa Cruz—Tenerife, Spain, Feb. 25-Mar. 1, 2019 (5 pages).
3GPP TS 29.510 V16.0.0 (Jun. 2019), 3rd Generation Partnership Project; Technical Specification Group Core Network and Terminals; 5G System; Network Function Repository Services; Stage 3 (Release 16), Jun. 2019 (135 pages).
3GPP TS 23.502 V16.1.1 (Jun. 2019), 3rd Generation Partnership Project; Technical Specification Group Services and System Aspects; Procedures for the 5G System; Stage 2 (Release 16), Jun. 2019 (495 pages).
3GPP TS 23.501 V16.1.0 (Jun. 2019), 3rd Generation Partnership Project; Technical Specification Group Services and System Aspects; System Architecture for the 5G System; Stage 2 (Release 16), Jun. 2019 (368 pages).

* cited by examiner

METHOD AND APPARATUS FOR SERVICE MANAGEMENT

CROSS REFERENCE TO RELATED APPLICATION(S)

This application is a 35 U.S.C. § 371 National Stage of International Patent Application No. PCT/CN2020/114262, filed Sep. 9, 2020, which claims priority to PCT/CN2019/105744, filed Sep. 12, 2019. The above identified applications are incorporated by this reference.

TECHNICAL FIELD

The non-limiting and exemplary embodiments of the present disclosure generally relate to the technical field of communications, and specifically to methods and apparatuses for service management.

BACKGROUND

This section introduces aspects that may facilitate a better understanding of the disclosure. Accordingly, the statements of this section are to be read in this light and are not to be understood as admissions about what is in the prior art or what is not in the prior art.

FIG. 1 schematically shows a high level architecture in the next generation network such as 5G. The system architecture of FIG. 1 may comprise some exemplary elements such as UE (User Equipment), AMF (Access and Mobility Management Function), SMF (Session Management Function), AUSF (Authentication Server Function), UDM (Unified Data Management), PCF (Policy Control Function), AF (Application Function), NSSF (Network Slice Selection Function), NEF (Network Exposure Function), UPF (User plane Function) and NRF (NF Repository Function), (R)AN ((Radio) Access Network), SCP (Service Communication Proxy), DN (Data Network), etc.

In accordance with an exemplary embodiment, the UE can establish a signaling connection with the AMF over the reference point N1, as illustrated in FIG. 1. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 1, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 1 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

In third Generation Partnership Project (3GPP) Technical Specification (TS) 23.501 V16.1.0, the disclosure of which is incorporated by reference herein in its entirety, service communication proxy (SCP) as a network element is introduced in service framework. Routing of the service based interface (SBI) messages for network function (NF) interaction mechanisms may be direct as shown in model A and model B of FIG. 2, or indirect in model C and model D of FIG. 2. In case of indirect communication, the SCP is employed by the NF service consumer. The SCP routes messages between NF service consumers and NF service producers and may do discovery and associated selection of the NF service producer on behalf of a NF service consumer.

In fifth generation system (5GS), the SCP can be deployed distributed, redundant, and scalable. SCPs can be deployed at PLMN (public land mobile network) level, shared-slice level and slice-specific level.

As shown in FIG. 2, in Model A—Direct communication without network repository function (NRF) interaction, neither NRF nor SCP are used. NF consumers are configured with NF producers' "NF profiles" and directly communicate with a producer of their choice.

In Model B—Direct communication with NRF interaction, NF consumers do discovery by querying the NRF. Based on the discovery result, the NF consumer does the selection. The NF consumer sends the request to the selected NF producer.

In Model C—Indirect communication without delegated discovery, NF consumers do discovery by querying the NRF. Based on discovery result, the NF consumer does the selection of a NF Set or a specific NF instance of NF instance set. The NF consumer sends the request to the SCP containing the address of the selected service producer pointing to a NF service instance or a set of NF service instances. In the latter case, the SCP selects a NF service instance. If possible, the SCP interacts with NRF to get selection parameters such as location, capacity, etc. The SCP routes the request to the selected NF service producer instance.

In Model D—Indirect communication with delegated discovery: NF consumers do not do any discovery or selection, the NF consumer adds any necessary discovery and selection parameters required to find a suitable producer to the service request. The SCP uses the request address and the discovery and selection parameters in the request message to route the request to a suitable producer instance. The SCP can perform discovery with an NRF and obtain a discovery result.

As described in clause 6.2.19 of 3GPP TS 23.501 V16.1.0, the SCP may include one or more of the following functionalities. Some or all of the SCP functionalities may be supported in a single instance of an SCP:

Indirect Communication.

Delegated Discovery.

Message forwarding and routing to destination NF/NF service.

Communication security (e.g. authorization of the NF Service Consumer to access the NF Service Producer API (Application Program Interface)), load balancing, monitoring, overload control, etc.

Optionally interact with other entity, e.g. UDR (Unified Data Repository), to resolve the UDM (Unified Data Management) Group ID (identifier)/UDR Group ID/AUSF (Authentication Server Function) Group ID/PCF (Policy Control Function) Group ID based on UE (user equipment) identity, e.g. SUPI (Subscription Permanent Identifier).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In current 5GS architecture, there are some problems. For example, when one NF instance in NF Set fails, the network can't automatically re-direct the request to other equivalent NF instance without service break, and without NF consumer intervention.

For the NF consumer, the discovery result can be cached locally. The NF consumer can use the local cache to shorten the end to end service operation latency. But the cache is for NF instances, NF consumer needs to monitor all instances separately to secure the cache information is valid, the process is complicated.

For the NF producer, sometimes the traffic load between all instances in the same NF set is not balanced, so there needs a method to improve the utilization of network resource.

To overcome or mitigate at least one above mentioned problems or other problems or provide a useful solution, the embodiments of the present disclosure propose an improved flow control solution.

In an embodiment, the service entry can be created by NF consumer, which can be used to improve the efficiency of service usage. One possible efficiency improvement is to simplify the NF consumer discovery requests, thereby reducing extra query request for each service session. For example, the NF consumer creates a service entry with a thicker granularity query parameter and leaves a further low level of granularity selection to SCP. One example case, AMF handle the UE registration case. Normally, AMF needs to find one AUSF/UDM instance according to the UE specific SUPI. For every request with different SUPI, AMF has to find AUSF/UDM instance separately. With the service entry, AMF can create a service entry with NFtype=AUSF, and plmn ID=local PLMN. The SCP will build related context for the AUSF service entry, i.e. the SCP will discovery all AUSF instances which serve the local PLMN, and build the internal mapping table for the SUPI to NF instances.

In an embodiment, the service entry also can be created by NF producer. In one example that the producer uses the service entry for canary upgrading, it can create a service entry in SCP at first, then the new installed NF producer can join to the service entry to share the traffic. The service entry can distribute the traffic according to pre-defined policy. e.g. 10% traffic goes to the new instance, and 90% traffic goes to the legacy traffic. In such a canary upgrading, some of the traffic will be oriented to a new version of the service. If everything is normal, then all customer traffic will be oriented to the new version. Otherwise, if the new version causes any error, the traffic will be oriented back to the old version.

In a first aspect of the disclosure, there is provided a method at a service communication proxy (SCP). The method comprises receiving a first request for creating a service entry, wherein the first request includes at least one parameter to build the service entry context. The method further comprises creating the service entry based on the parameters in the first request. The method further comprises applying the service entry to process a service request from a network function (NF) consumer.

In an embodiment, the method may further comprise: sending a second request for discovering related NF instances, to network repository function, NRF and receiving a second response to the first request, the second response includes a list of the related NF instances.

In an embodiment, the method may further comprise: sending a first message to the NRF to update the repository of NRF, wherein the first message includes the service entry context information as part of NF profile of the SCP.

In an embodiment, the method may further comprise: sending a first response to the first request to the NF consumer, wherein the first response includes an address of the service entry.

In an embodiment, the first request is for creating a service entry for one NF set, in which the NF instances in the one NF set provides the same service capability.

In an embodiment, method may further comprise: sending the second request for discovering NF instances in the one NF set and receiving the second response to the first request, the second response includes a list of the NF instances in the one NF set.

In an embodiment, wherein the creating the service entry based on the parameters in the first request comprises: establishing connections with the NF instances in the one NF set.

In an embodiment, the applying the service entry to process a service request from a NF consumer may comprise: receiving a service request, the service request includes the address of the service entry; selecting a NF instance according to the policies in service entry context; sending the service request to the NF instance.

In an embodiment, the first request is for creating a service entry for NF instances of the same type.

In an embodiment, the at least one parameter comprises NF type.

In an embodiment, the method may further comprise: sending the second request for discovering NF instances of the same type; the method may further comprise: receiving the second response to the first request, wherein the second response includes a list of the NF instances of the same type.

In an embodiment, the second response further comprises a list of UE identifiers.

In an embodiment, the method may further comprise: establishing a mapping between the UE identifiers and the NF instances of the same type.

In an embodiment, the UE identifiers are Subscription Permanent Identifier, SUPIs or Generic Public Subscription Identifier, GPSI. The instances of the same type are Unified Data Management, UDM, instances, or Policy Control Function, PCF instances, or User Data Repository, UDR instances, or Authentication Server Function, AUSF instances.

In an embodiment, the method further comprises: establishing connections with the NF instances of the same type.

In an embodiment, the applying the service entry to process a service request from a NF consumer comprises: receiving a service request, the service request includes the address of the service entry; and determining a NF instance based on the mapping; and sending the service request to the NF instance.

In a second aspect of the disclosure, there is provided a method a network function (NF). The method comprises determining at least one parameter for creating a service entry by a service communication proxy, SCP. The method further comprises sending a first request for creating the service entry to the SCP.

In an embodiment, the first request is for creating a service entry for one NF set, in which the NF instances in the one NF set provides the same service capability.

In an embodiment, the first request is for creating a service entry for NF instances of the same type.

In an embodiment, the at least one parameter comprises NF type.

In an embodiment, the first request further comprises at least one rule applied to the service entry.

In an embodiment, the method further comprises: receiving a first response to the first request from the SCP, the first response includes an address of the service entry.

In an embodiment, the method further comprises: discovering the SCP via a network repository function, NRF.

In an embodiment, the method further comprises: sending a service request to the SCP, wherein the service request includes the address of the service entry.

In another aspect of the disclosure, there is provided an apparatus at a service communication proxy (SCP). The apparatus comprises a processor; and a memory coupled to the processor, said memory containing instructions executable by said processor, whereby said apparatus is operative to receive a first request for creating a service entry, wherein the first request includes at least one parameter to build the service entry context. Said apparatus is further operative to create the service entry based on the parameters in the first request. Said apparatus is further operative to apply the service entry to process a service request from a network function (NF) consumer.

In another aspect of the disclosure, there is provided an apparatus at a network function (NF). The apparatus comprises a processor; and a memory coupled to the processor, said memory containing instructions executable by said processor, whereby said apparatus is operative to determine at least one parameter for creating a service entry by a service communication proxy, SCP. Said apparatus is further operative to send a first request for creating the service entry to the service communication proxy, SCP.

In another aspect of the disclosure, there is provided a computer-readable storage medium storing instructions which when executed by at least one processor, cause the at least one processor to perform the method according to the first aspect of the disclosure.

In another aspect of the disclosure, there is provided a computer program product, comprising instructions which, when executed on at least one processor, cause the at least one processor to carry out the method according to the first aspect of the disclosure.

In another aspect of the disclosure, there is provided a computer-readable storage medium storing instructions which when executed by at least one processor, cause the at least one processor to perform the method according to the second aspect of the disclosure.

In another aspect of the disclosure, there is provided a computer program product, comprising instructions which, when executed on at least one processor, cause the at least one processor to carry out the method according to the second aspect of the disclosure.

Many advantages may be achieved by applying the proposed solution according to embodiments of the present disclosure. For example, some embodiments of the present disclosure can provide the way for NF consumer to customize and optimize its service operation. For example, for the High frequency access service, the consumer can customize the query parameters one time, and create the service entry in SCP. After then, all subsequent similar operation can be sent directly to that service entry URI (Uniform Resource Identifier) instead of doing discovery first. And the service entry can be used to introduce the new installation to share traffic without any NF consumer awareness. And also, it provides a new way to balance the network workload.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
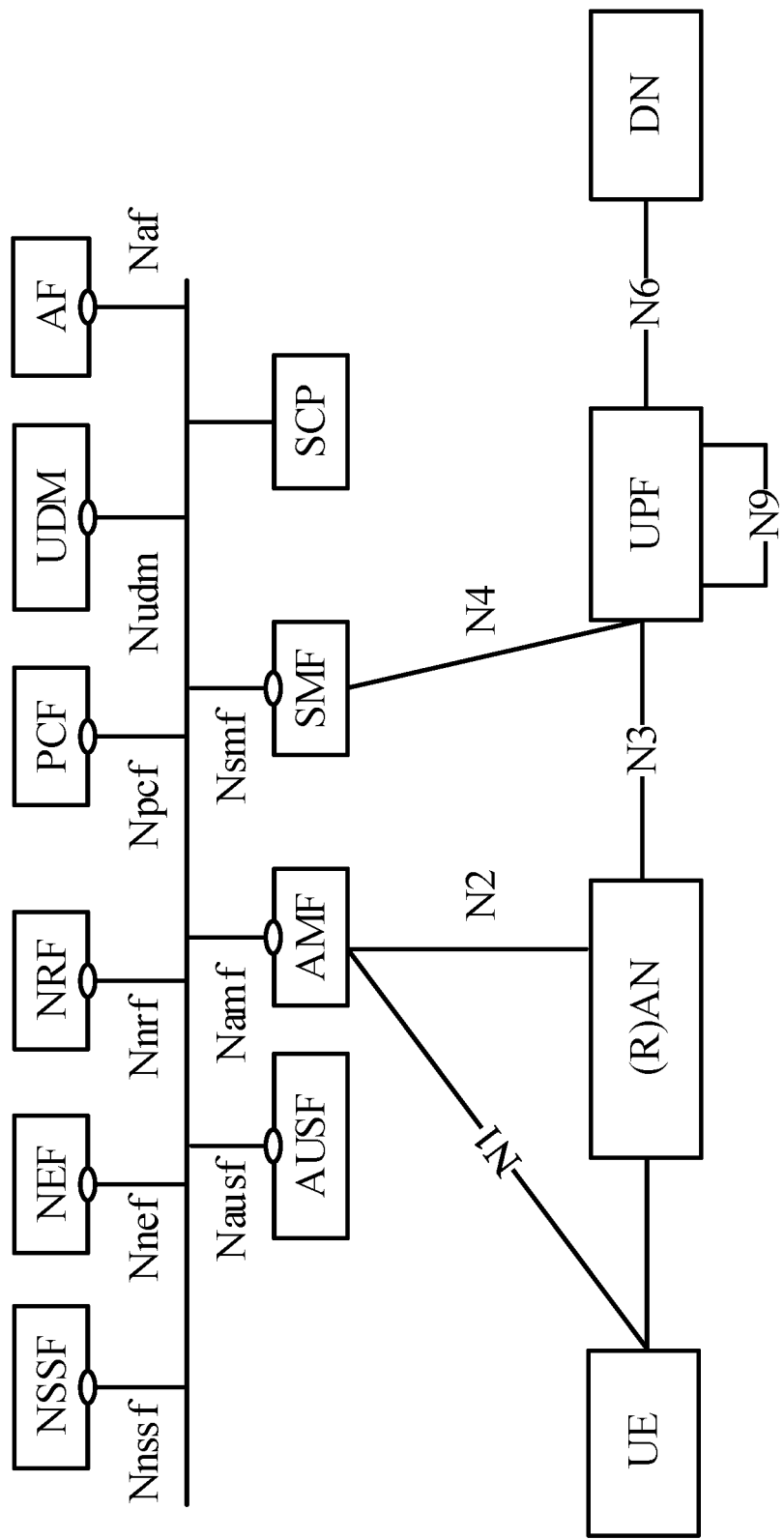
FIG. 1 schematically shows a high level architecture in the next generation network.
Figure 2:
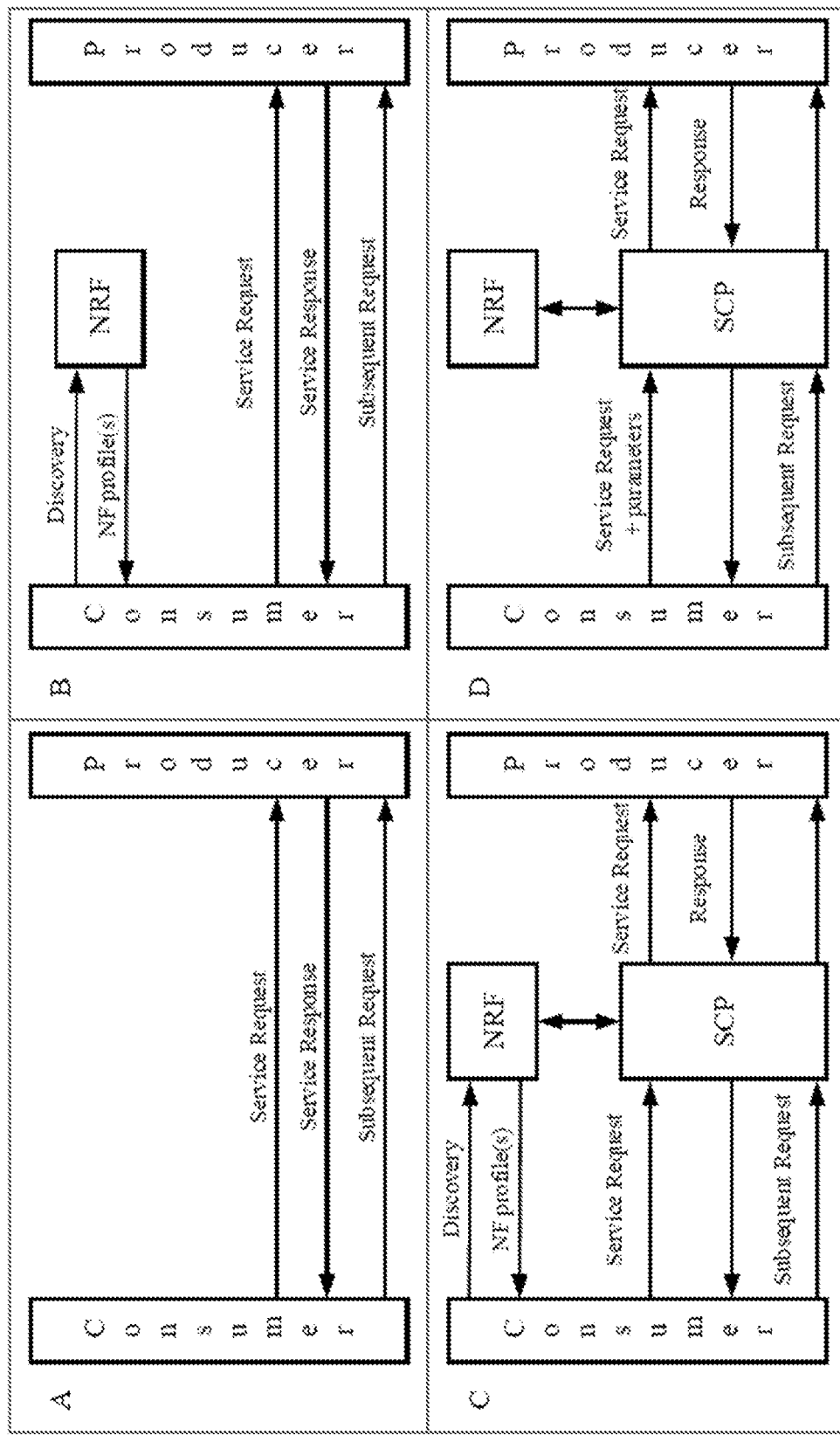
FIG. 2 schematically shows communication models for NF/NF services interaction.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR). In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the fifth generation (5G) communication protocols, and/or any other protocols either currently known or to be developed in the future.

The term "network device" or "network node" used herein refers to a network entity such as a core network device in a communication network. For example, in a wireless communication network such as a 3GPP-type cellular network, the network node may implement various network functions, which may offer numerous services to customers who are interconnected by an access network device. Each access network device is connectable to the core network device over a wired or wireless connection.

The term "network function (NF)" refers to any suitable function which can be implemented in a network node (physical or virtual) of a communication network. For example, the 5G system (5GS) may comprise a plurality of NFs such as AMF (Access and Mobility Management Function), SMF (Session Management Function), AUSF (Authentication Server Function), UDM (Unified Data Management), PCF (Policy Control Function), AF (Application Function), NEF (Network Exposure Function), UPF (User plane Function) and NRF (NF Repository Function), (R)AN ((radio) access network), SCP (service communication proxy), etc. In other embodiments, the network function may comprise different types of NFs for example depending on a specific type of network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3 GPP, such as 3 GPP' LTE (long term evolution) standard or NR (new radio) standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

As used herein, the NF consumer may be any suitable NF or NF instance which needs to use one or more services provided by another NF. The NF producer may be any suitable NF or NF instance which can provide one or more services to one or more NF consumers. For example, NRF can provide service discovery function to any other NF instance or SCP. In this case, NRF is the NF producer and said any other NF instance or SCP is the NF consumer. As another example, if a NF can provide one or more services to any other NFs, it will register its NF profile in the NRF.

In this case the NF is the NF consumer of NRF and the NF producer of said any other NFs.

As used herein, SCP can register, de-register, and update its profile in NRF, e.g. similar as a NF. A NF consumer can discover the appropriate SCP(s) for different purpose via NRF. To make SCP to register itself into NRF, the SCP can register, de-register, update its profile in NRF, e.g. similar as a NF. The profile of SCP may include its function/feature capability, deployment topology, and/or query parameters for discovery. For example, the parameters can be locality of SCP, the capacity, the priority etc. NF consumer can discover the appropriate SCP(s) for different purpose. For example, to find a default forwarding proxy in the same data center, the NF consumer can use the locality as query parameter to do discovery. NF consumer can subscribe interested SCP(s) status, and it can take action based on status notification. For example, NF consumer can change to a new SCP when the previous serving SCP is down, or busy etc.

In 5G SA (Stand Alone) network, NF Set is an important logical concept. It indicates a group of interchangeable NF instances, supporting the same services and the same Network Slice(s). The NF instances in the same NF Set may be geographically distributed but have access to the same context data.

If NF consumer wants to employ a NF service belonging to such NF Set, NF consumer needs to find and select one NF instance in NF Set to communicate with. NF consumer needs to care about the health of that specific selected NF instance in NF set. In case the selected NF instances fails, the NF consumer needs to re-select a new instance, and could cause the request failure due to one target in NF set failure.

The NF Set is deployed in network for redundancy, and load balancer etc., but due to that the target is selected by NF consumer (client side), this kind of selections are decided independently by each NF consumer itself.

Figure 3:
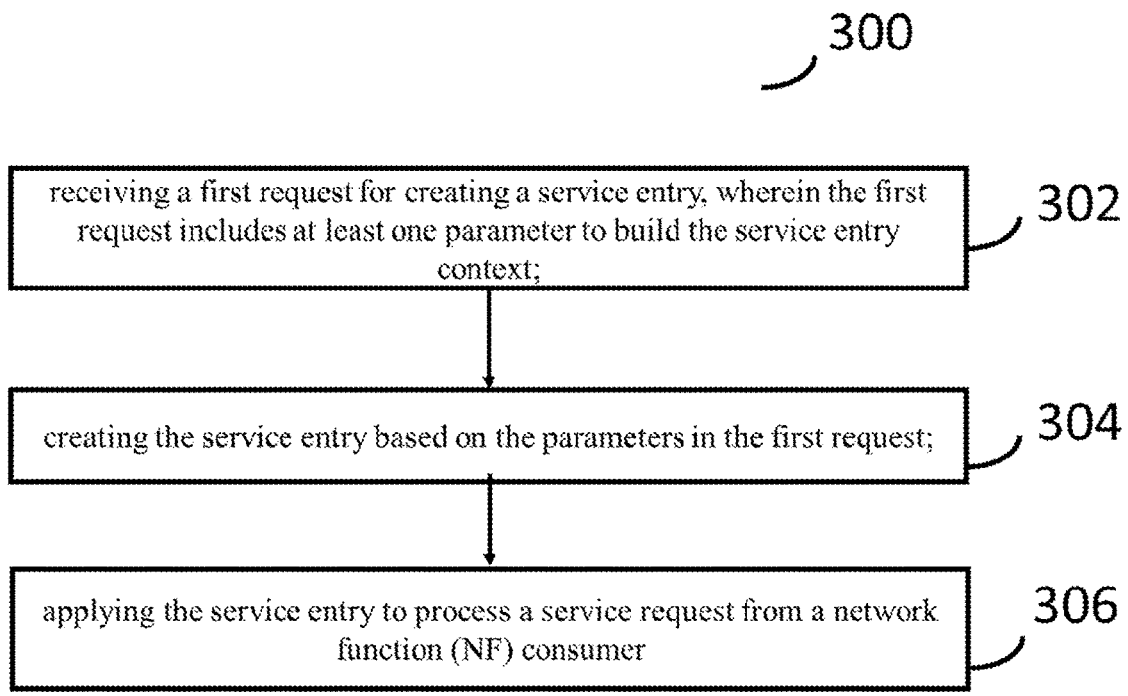
FIG. 3 shows a flowchart of a method according to an embodiment of the present disclosure.

FIG. 3 shows a flowchart of a method according to an embodiment of the present disclosure, which may be performed by an apparatus implemented in/at or communicatively coupled to a SCP. As such, the apparatus may provide means for accomplishing various parts of the method 300 as well as means for accomplishing other processes in conjunction with other components.

At block 302, the SCP receives a first request for creating a service entry, wherein the first request includes at least one parameter to build the service entry context. The SCP may provide service communication proxy function similar to the SCP as described in clause 6.2.19 of 3GPP TS 23.501 V16.1.0. In other embodiments, the SCP may be any suitable service communication proxy in other communication network. The SCP may be triggered to create the service entry in various ways. In one embodiment, the first request may be transmitted from a NF consumer. For example, NF consumer sends the first request to create the service entry for various reasons, e.g.: to improve the efficiency of service usage or anchor the NF set via service entry. In another embodiment, the first request may be transmitted from a NF producer. For example, the NF producer can send the first request to SCP for various reasons, e.g.: canary upgrading.

The at least one parameter in the first request may be of different types depending on the purpose. For example, if the NF consumer wants to create a service entry for "NF SET A" on the SCP, the parameters can be the "NF set=NF set A" to indicate the specific NF set. In another example, if the NF consumer wants to create a service entry to avoid the high frequent NRF discovery request, the parameters can be as following: NF type=UDM, target-plmn-list=local PLMN, in which the parameter "NF type" is to define the NF instance type, and the parameter "target-plmn-list" is to define the scope of the NF instances is the PLMN (public land mobile network).

And the parameters can also be policies related parameters indicating the policies needed to be applied to the SCP. For example, the policy may be for workload balance to protect the NF producer instance from overload. In another example, the policy may be for quick response to choose the NF producer instance which has the smallest latency. And further, these parameters can be updated according to request of the creator of the service entry (for example, by the NF consumer or the NF producer).

In one embodiment, after SCP receives the first request, it sends a second request for discovering related NF instances, to network repository function, NRF. And when NRF receives the second request, it will determine the related NF instances, and send the list of the related NF instances to the SCP. The list of the NF instances can be determined based of the request. For example, if the first request is for creating a service entry for one NF set, in which the NF instances in the one NF set provide the same service capability, the NRF will determine the list of the NF instances of the same set. In another example, if the first request is for creating a service entry for NF instances of the same type, e.g.: UDM, the NRF will determine the list of the NF instances of the same type, herein the NF instances of the same type may be not in the same set. In another example, if the first request is for creating a service entry for NF instances which have at least one same commonality, herein the NF instances of the same commonality may not of the same set nor of the same type, the NRF will determine the list of theses specific NF instances.

At block 304, the SCP creates the service entry based on the parameters in the first request. The service entry can be created in various ways. For example, SCP creates the service entry context for the NF set A based on the list of the NF instance of NF set A, SCP prepares corresponding resources, monitors those instance statuses, and the SCP establishes the corresponding connections in advance and is prepared to receive external service requests. In another example, SCP establishes a mapping between the UE identifiers and the NF instances of the same type in the PLMN, then SCP prepares the corresponding resources, and the SCP establishes connection with all selected NF instances and monitors their status.

In an embodiment, the method may further comprise sending a first response to the first request to the NF consumer, wherein the first response includes an address of the service entry. The address of the service entry may be in various format that can make the NF find the service entry. For example, the address of the service entry may be the resource URI of the service entry.

In an embodiment, the method may further comprise sending a first message to the NRF to update the repository of NRF, and the first message includes the service entry context information as part of NF profile of the SCP, so that other NF can find the address of the service entry via NRF.

At block 306, the SCP applies the service entry to process a service request from a network function (NF) consumer. This step can be implemented in various ways. In one embodiment, if the SCP received a service request for NF set A, including the address of the service entry, it will select a NF instance according to the policies in service entry context, and then send the service request to the selected NF instance. The policies herein can be various, e.g.: if the policy is for workload balance to protect the NF producer instance from overload, the SCP will choose a NF producer which has a lower workload; if the policy maybe for quick response, the SCF will choose the NF producer instance which has the shortest end-to-end delay. In another example, if receiving a service request for the same type instances, the SCP will determine a NF instance based on the mapping, and then send the service request to the NF instance.

Figure 4:
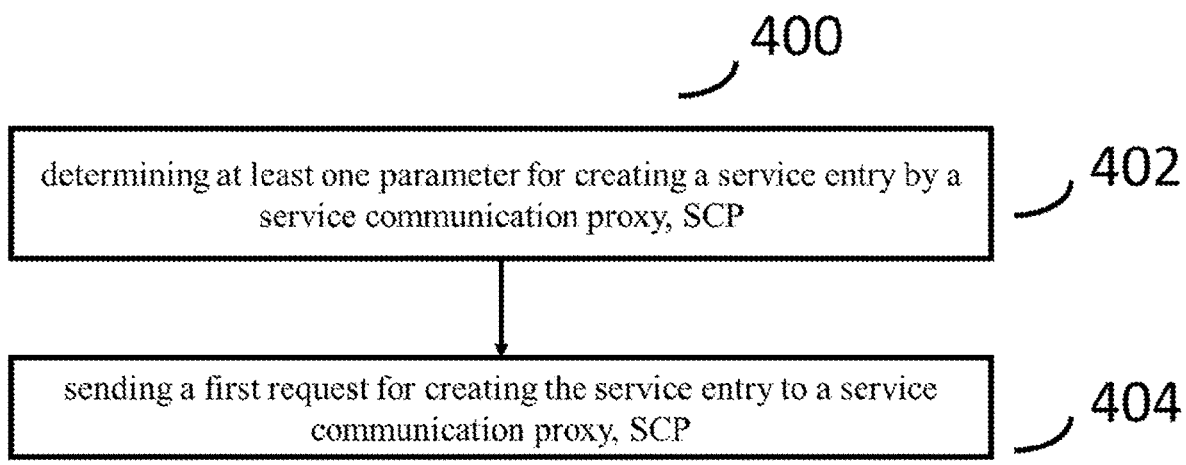
FIG. 4 shows a flowchart of a method according to another embodiment of the present disclosure.

FIG. 4 shows a flowchart of a method according to another embodiment of the present disclosure, which may be performed by an apparatus implemented in/at or communicatively coupled to a NF. As such, the apparatus may provide means for accomplishing various parts of the method 400 as well as means for accomplishing other processes in conjunction with other components. For some parts which have been described in the above embodiments, and detailed description thereof is omitted here for brevity.

At block 402, the NF determines at least one parameter for creating a service entry by a service communication proxy, SCP. The NF herein can be NF consumer or NF producer. For example, NF consumer sends the first request to create the service entry for various reasons, e.g.: to improve the efficiency of service usage or anchor the NF set via service entry. In another embodiment, the first request may be transmitted from a NF producer. For example, the NF producer can send the first request to SCP for various reasons, e.g.: canary upgrading.

The at least one parameter in the first request may be of different types depending on the purpose. For example, if the NF consumer wants to create a service entry for "NF SET A" on the SCP, the parameters can be the "NF set=NF set A" to indicate the specific NF set. In another example, if the NF consumer wants to create a service entry to avoid the high frequent NRF discovery request, the parameters can be as following: NF type=UDM, target-plmn-list=local PLMN, in which the parameter "NF type" is to define the NF instance type, and the parameter "target-plmn-list" is to define the scope of the NF instances is the PLMN (public land mobile network). And the parameters can also be policies related parameters indicating the policies needed to be applied to the SCP.

At block 404, the NF sends a first request for creating the service entry to the service communication proxy, SCP. After NF sends the first request to the SCP, the SCP will create the service entry. The process of the creating has been described in the above embodiments, and detailed description thereof is omitted here for brevity.

In an embodiment, the method further comprises receiving a first response to the first request from the SCP, and the first response includes an address of the service entry.

In an embodiment, the method further comprises discovering the SCP via a network repository function, NRF.

In an embodiment, the method further comprises sending a service request to the SCP, and the service request includes the address of the service entry. After sending the service request to the SCP, the SCP will apply service entry to process the service request. The process of the applying has been described in the above embodiments, and detailed description thereof is omitted here for brevity.

The advantages of the above embodiment are as following: the service entry is provided for a set of NF producers to create logic anchor point to attract the service requests to a gateway, and the network level load balancing, policy enforcement can be implemented in that. The polices on the service entry can be diverse and rich enough to meet specific application scenarios. For example, as to a time-based policy, the service entry can be set to: which NF instance shall be avoided to be used in busy hour by which NF producer.

Figure 5:
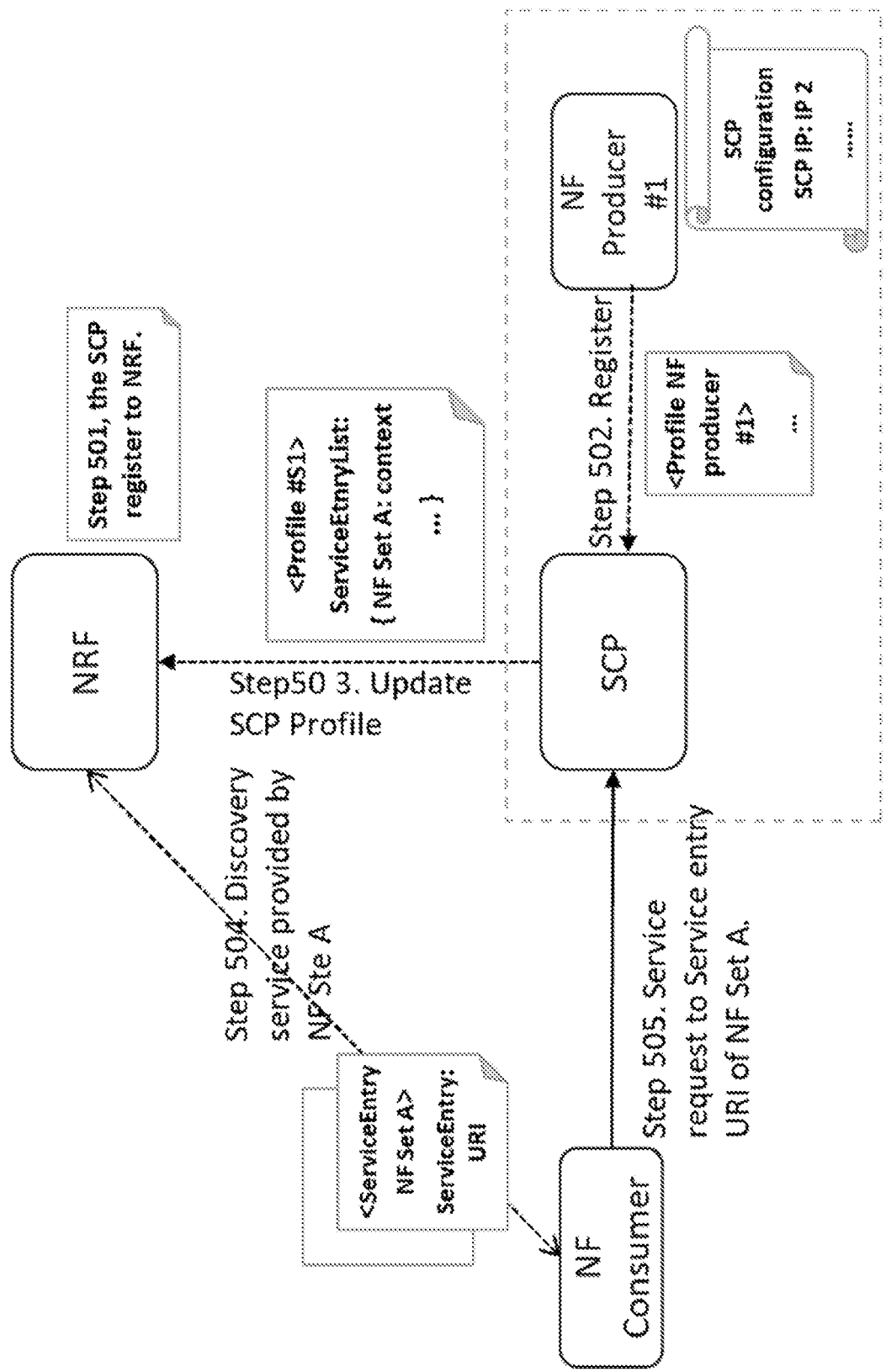
FIG. 5 shows a flowchart of a method according to another embodiment of the present disclosure.

FIG. 5 shows a flowchart of a method according to another embodiment of the present disclosure. In this embodiment, the service entry creation is triggered by the NF producer.

In step 501, the SCP is registered as a NF to the NRF.

In step 502, the SCP is configured in NF Producer #1 for SBI intermediate communication. NF producer #1 sends a registration message with its profile to NRF via the SCP.

In step 503, the SCP profile is updated. Particularly, the step 503 may include step S503a, and step S503b. In step 503a, the SCP creates a Service Entry to anchor the services for this NF producer #1.

In step 503b, if in this SCP, a service entry for NF Set A is already there, and the NF producer #1 belongs to the NF Set A, SCP will add NF producer #1 as one instance of a NF Set into the existing service entry for NF Set A.

SCP sends Nnrf profile update message to the NRF with added Service Entry context.

In step 504, by querying NRF, the NF consumer makes discovery to find the NF Set A. The NRF responds to all matching NF instances and service entry for NF Set A.

In step 505, the NF consumer selects the service entry as target, and sends the service request to the address of service entry. SCP receives and forwards this request to the real selected backend NF producer instance. For all subsequent requests to NF Set A can be sent to the service entry URI instead of selecting the NF instance.

Figure 6:
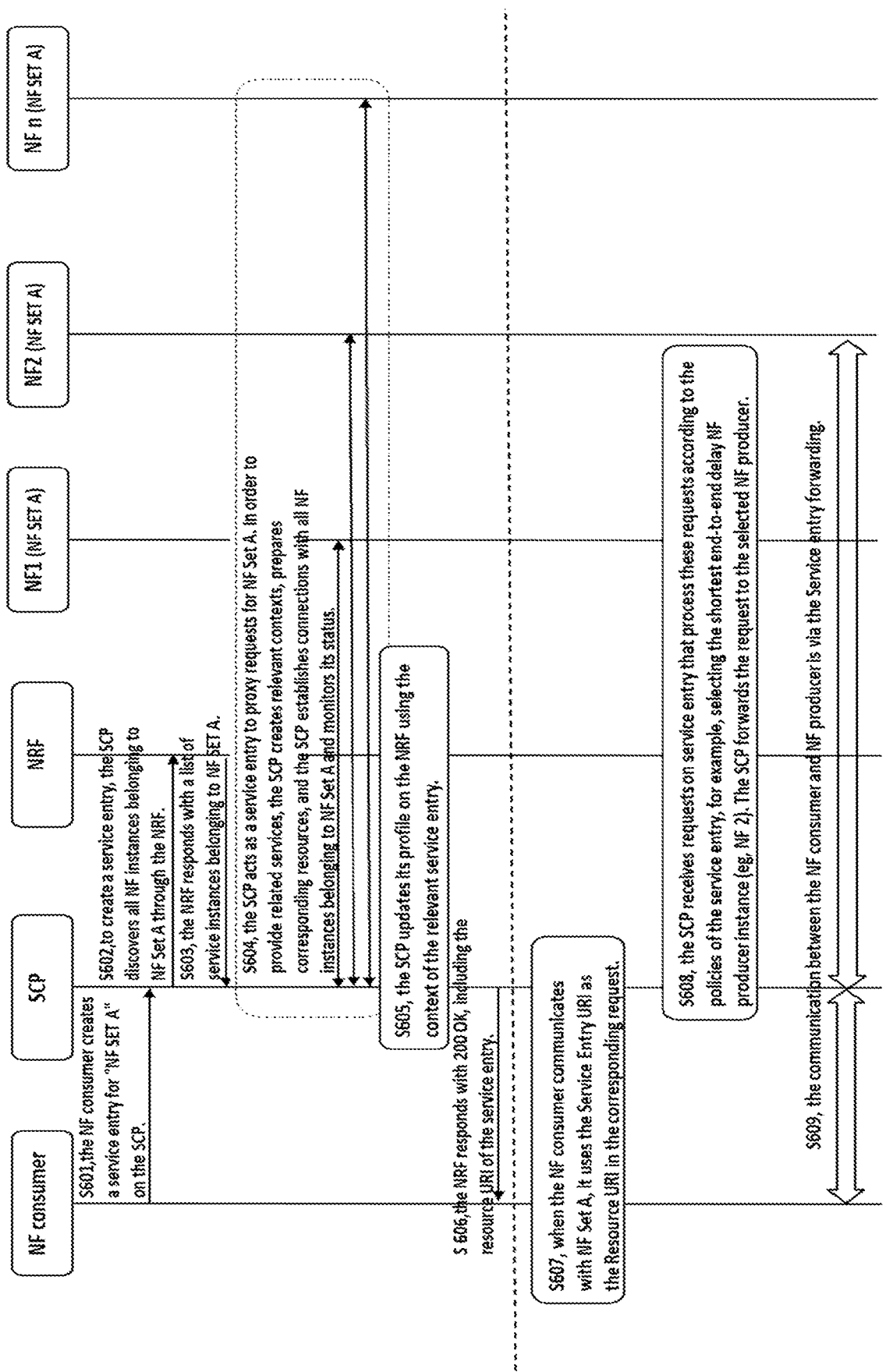
FIG. 6 shows a flowchart of a method according to another embodiment of the present disclosure.

FIG. 6 shows a flowchart of a method according to another embodiment of the present disclosure. In this embodiment, the service entry creation is triggered by the NF consumer.

In step S601, the NF consumer creates a service entry for "NF SET A" on the SCP. The request can also comprise some policies related parameters (e.g. load balancer model) which are used to build the service entry context in SCP.

In step S602, the SCP create a service entry according to the request from NF consumer. This service entry will anchor all requests to NF Set A, and the policies in request will be also applied.

The SCP discovers all NF instances belonging to NF set A through the NRF.

In step S603, the NRF responds with a list of service instances belonging to NF SET A.

In step S604, the SCP creates the service entry context for the NF set A, SCP prepares corresponding resources, monitors those instance statuses, and the SCP establishes the corresponding connections in advance and is prepared to receive external service requests. The SCP acts as a service entry to proxy requests for NF Set A.

In step S605, the SCP updates its profile on the NRF using the context of the relevant service entry. So, any NF consumer can discover the service entry of NF Set A, and can use the service entry URI for service request towards NF Set A.

In step S606, the NRF responds with 200 OK, including the resource URI of the service entry.

In step S607, when NF consumer wants to employ the service provided by NF Set A, it uses the Service Entry URI as the Resource URI in the corresponding request.

For other NF consumers, the service Entry URI also can be found through a discovery request to NRF.

In step S608, the SCP receives requests on service entry that process these requests according to the policies of the service entry, for example, selecting the shortest end-to-end delay NF producer instance (e.g., NF 2). The SCP forwards the request to the selected NF producer.

In step S609, the communication between the NF consumer and NF producer is via the Service entry forwarding.

Through creating the service entry for the same NF set in SCP, all subsequent similar operation can be sent directly to that service entry URI instead of doing discovery first, thus redundant signaling are avoided and the NF discovery process for the same NF set is simplified.

Figure 7:
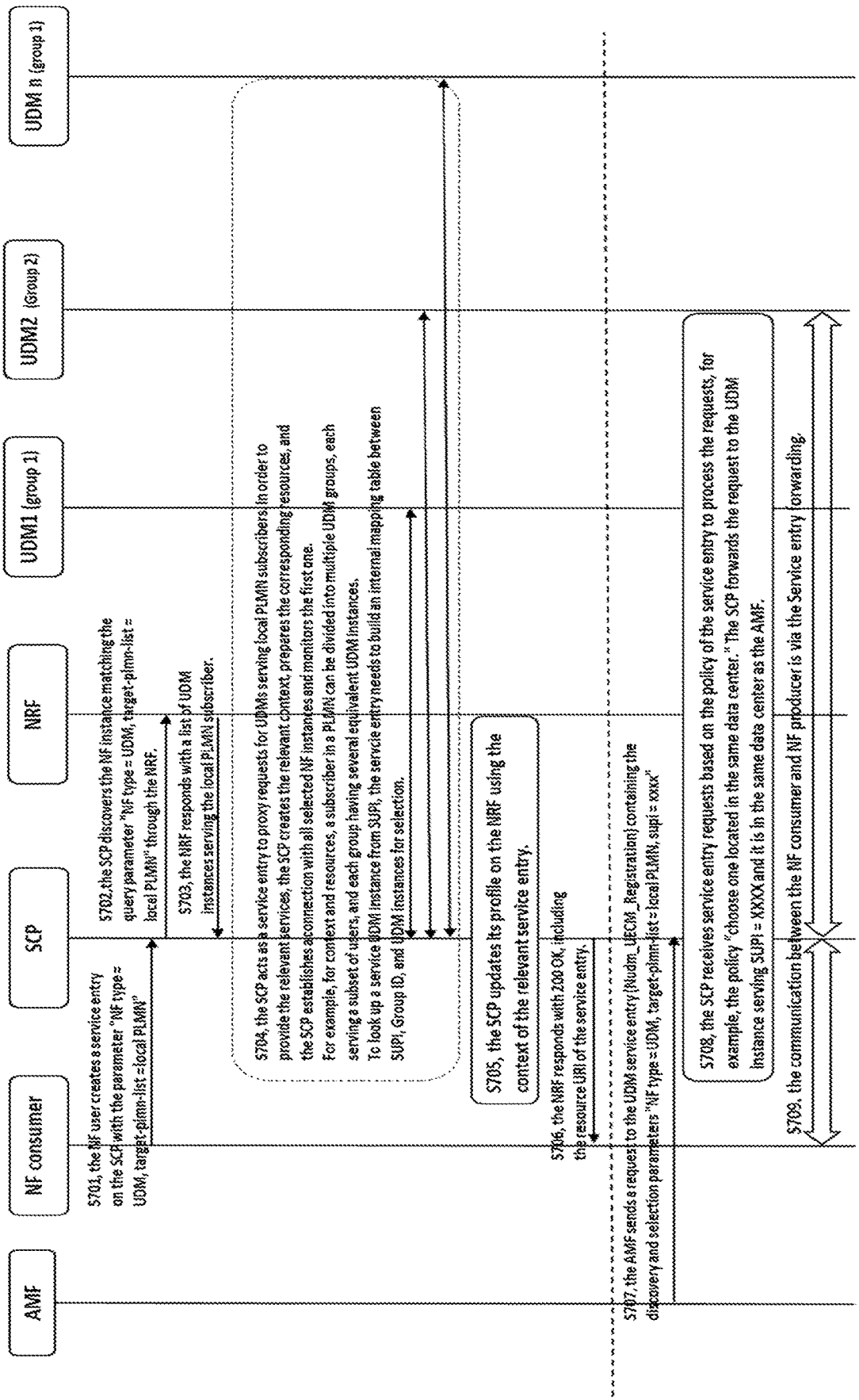
FIG. 7 shows a flowchart of a method according to another embodiment of the present disclosure.

FIG. 7 shows a flowchart of a method according to another embodiment of the present disclosure. In this embodiment, the service entry creation is triggered by the NF consumer.

In step S701, the NF consumer wants to create a service entry to avoid the high frequent NRF discovery request caused by finer granularity selection parameter, e.g. UDM selection for different SUPI.

The NF consumer creates a service entry on the SCP with the parameter: "NF type=UDM, target-plmn-list=local PLMN". This is a thicker granularity for UDM selection.

In step S702, to create the requested service entry above, the SCP needs to build the context for it. At first, the SCP discovers the NF instance matching the query parameter "NF type=UDM, target-plmn-list=local PLMN" through the NRF.

In step S703, the NRF responds with a list of UDM instances serving the local PLMN subscriber.

In step S704, based on those NF profile from NRF, and policies from the request, the SCP creates the relevant context, prepares the corresponding resources, and the SCP establishes connection with all selected NF instances and monitors their status. The SCP acts as a service entry to proxy requests for UDMs serving local PLMN subscribers.

For example, for context and resources, a subscriber in a PLMN can be divided into multiple UDM groups, each serving a subset of users, and each group having several equivalent UDM instances.

To look up a service/UDM instance from SUPI, the service entry needs to build an internal mapping table between SUPI, Group ID, and UDM instances for selection.

In step S705, after all those contexts and resource prepared, the SCP updates its profile on the NRF with the information of service entry, e.g. by using the context of the relevant service entry.

In step S706, the NRF responds with 200 OK, including the resource URI of the service entry.

In step S707, when an AMF needs to talk with UDM for specific subscriber (identified by SUPI), AMF can discover through the NRF with thicker granularity filter parameter (i.e. NF type=UDM, target-plmn-list=local PLMN) to find the service entry, and send the request to that service entry directly instead of selecting a UDM instance. And this service entry can be cached locally, and can be used for any subsequent similar request.

In step S708, the SCP receives service entry requests based on the policy of the service entry to process the requests, for example, a policy "choose one located in the same data center." The SCP forwards the request to the UDM instance serving SUPI=XXXX and it is in the same data center as the AMF.

In step S709, the communication between the NF consumer and NF producer is via the Service entry forwarding.

Through creating the service entry for the same type NF instance, UDM, in SCP, all subsequent similar operation can be sent directly to that service entry URI instead of doing discovery at first, thus redundant signaling are avoided and the UDM discovery process can be simplified.

Figure 8:
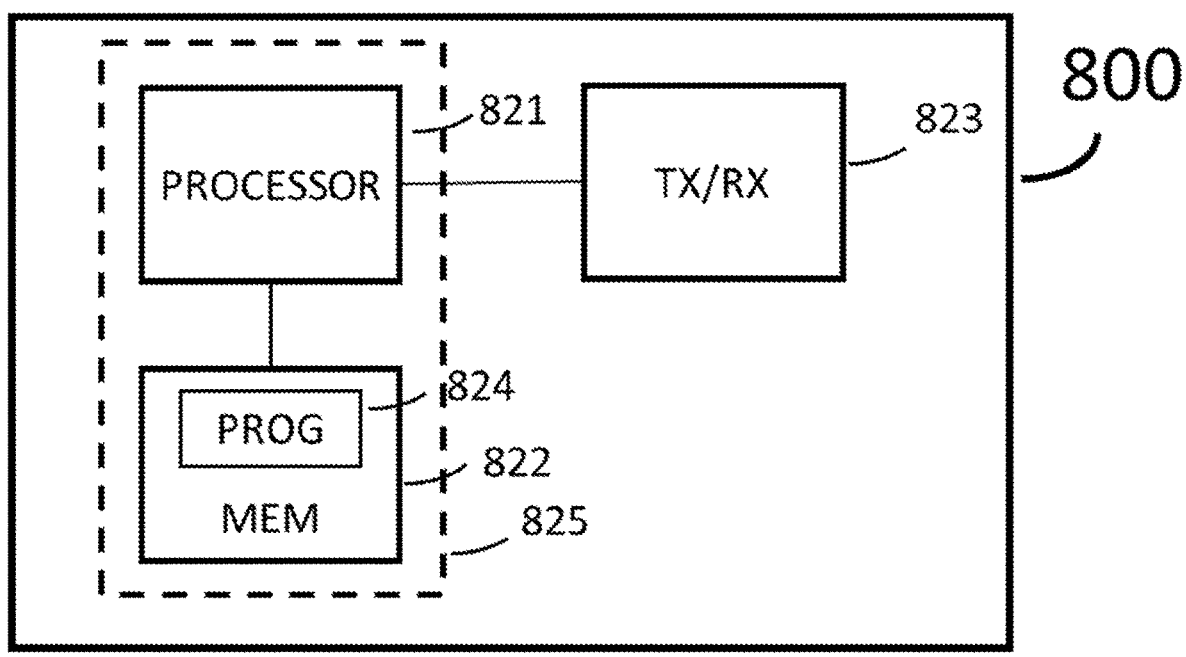
FIG. 8 is a block diagram showing an apparatus suitable for use in practicing some embodiments of the disclosure.

FIG. 8 is a block diagram showing an apparatus suitable for use in practicing some embodiments of the disclosure. For example, any one of the SCP or the NF such as NF service consumer as described above may be implemented through the apparatus 800.

The apparatus 800 comprises at least one processor 821, such as a DP (data processor/digital processor), and at least one memory MEM 822 coupled to the processor 821. The apparatus 820 may further comprise a transmitter TX and receiver RX 823 coupled to the processor 821. The MEM 822 stores a program PROG 824. The PROG 824 may include instructions that, when executed on the associated processor 821, enable the apparatus 820 to operate in accordance with the embodiments of the present disclosure. A combination of the at least one processor 821 and the at least one MEM 822 may form processing means 825 adapted to implement various embodiments of the present disclosure.

Various embodiments of the present disclosure may be implemented by computer program executable by one or more of the processor 821, software, firmware, hardware or in a combination thereof.

The MEM 822 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 821 may be of any type suitable to the local technical environment, and may include one or more of general purpose computers, special purpose computers, microprocessors, digital signal processors DSPs and processors based on multicore processor architecture, as non-limiting examples.

According to an aspect of the disclosure it is provided a computer program product being tangibly stored on a computer readable storage medium and including instructions which, when executed on at least one processor, cause the at least one processor to carry out any of the methods related to the SCP as described above.

According to an aspect of the disclosure it is provided a computer program product being tangibly stored on a computer readable storage medium and including instructions which, when executed on at least one processor, cause the at least one processor to carry out any of the methods related to the NF as described above.

According to an aspect of the disclosure it is provided a computer-readable storage medium storing instructions which when executed by at least one processor, cause the at least one processor to carry out any of the methods related to the SCP as described above.

According to an aspect of the disclosure it is provided a computer-readable storage medium storing instructions which when executed by at least one processor, cause the at least one processor to carry out any of the methods related to the NF as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RANI (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform one or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a service communication proxy (SCP), comprising:
   the SCP receiving a first service entry request for triggering the SCP to create a service entry, wherein the first service entry request includes at least one parameter to build a context for the service entry, and wherein the SCP creates the service entry by establishing corresponding connections in advance and thereby preparing to receive external service requests;
   in response to receiving the first service entry request, the SCP creating the service entry based on the at least one parameter in the first service entry request;
   the SCP receiving from a network function (NF) consumer a service request;
   in response to receiving the service request from the NF consumer, the SCP applying the service entry to process the service request; and
   sending a first response to the first service entry request, wherein the first response includes a resource identifier for identifying the service entry.

2. The method of claim 1, wherein creating the service entry comprises:
   sending to a network repository function (NRF) a discovery request for discovering related NF instances; and;
   receiving a discovery response responsive to the discovery request, wherein the discovery response includes a list of the related NF instances.

3. The method of claim 2, further comprising:
   sending an update message to the NRF to update a repository of NRF, wherein the update message includes context information for the service entry as part of NF profile of the SCP.

4. The method of claim 1, wherein the first service entry request is for creating a service entry for a set of NF instances, wherein each NF instance included in the set provides the same service capability.

5. The method of claim 4, wherein creating the service entry comprises:
   sending to a network repository function (NRF) a discovery request for discovering NF instances included in the set of NF instances; and
   receiving a discovery response responsive to the discovery request, wherein the discovery response includes a list of the NF instances, wherein each NF instance identified by the list is included in the set of NF instances.

6. The method of claim 5, further comprising:
   after receiving the discovery response, establishing a connection with one or more NF instances identified in the list of NF instances.

7. The method of claim 5, wherein
   applying the service entry to process the service request comprises:
   selecting an NF instance from the list of NF instances; and
   sending the service request to the selected NF instance.

8. The method of claim 1, wherein the first service entry request is for creating a service entry for NF instances of a specified NF type.

9. The method of claim 8, wherein the at least one parameter comprises an NF type parameter specifying an NF type.

10. The method of claim 9, wherein creating the service entry comprises:
sending to a network repository function (NRF) a discovery request for discovering NF instances of the NF type specified by the NF type parameter; and
receiving a discovery response responsive to the discovery request, wherein the discovery response includes a list of the NF instances, wherein each NF instance included in the list is an NF instance of the NF type specified by the NF type parameter.

11. The method of claim 10, wherein the discovery response further comprises a list of UE identifiers.

12. The method of claim 11, further comprising:
establishing a mapping between the UE identifiers and the NF instances included in the list of NF instances.

13. The method of claim 12, wherein
each UE identifier included in the list of UE identifiers is a Subscription Permanent Identifier (SUPI) or a Generic Public Subscription Identifier (GPSI), or
each NF instance included in the list of NF instances is a Unified Data Management instance, a Policy Control Function instance, a User Data Repository instance, or an Authentication Server Function instance.

14. The method of claim 10, further comprising:
after receiving the discovery response, establishing a connection with each NF instance included in the list of NF instances.

15. The method of claim 12, wherein the applying the service entry to process the service request comprises:
selecting a NF instance based on the mapping; and
sending the service request to the selected NF instance.

16. An apparatus, comprising:
a receiver for receiving a first service entry request for triggering the apparatus to create a service entry, wherein the first service entry request includes at least one parameter to build a context for the service entry;
a processor; and
a memory coupled to the processor, said memory containing instructions executable by said processor, wherein said apparatus is configured to perform a method comprising:
in response to receiving the first service entry request, creating the service entry based on the at least one parameter in the first service entry request, wherein the service entry is created by establishing corresponding connections in advance and thereby preparing to receive external service requests; and
in response to receiving a service request from a network function (NF) consumer, applying the service entry to process the service request; and
sending a first response to the first service entry request, wherein the first response includes a resource identifier for identifying the service entry.

17. The apparatus of claim 16, wherein creating the service entry comprises:
sending to a network repository function (NRF) a discovery request for discovering related NF instances;
processing a discovery response transmitted by the NRF, wherein the discovery response includes a list of the related NF instances.

18. A method, comprising:
a service communication proxy (SCP) receiving from a network function (NF) instance a service entry request for creating a service entry, wherein the service entry request comprises a first parameter for use in creating the service entry, and wherein the SCP creates the service entry by establishing corresponding connections in advance and thereby preparing to receive external service requests;
in response to receiving the service entry request for creating the service entry, the SCP sending to a network repository function (NRF) a discovery request comprising the first parameter that was comprised in the first service entry request;
the SCP receiving a discovery response responsive to the discovery request, wherein the discovery response includes a list of the NF instances obtained by the NRF based on the first parameter; and
the SCP transmitting to the NF instance a response message responsive to the service entry request, wherein the response message comprises a resource identifier for identifying the list of NF instances.

19. The method of claim 18, further comprising:
receiving a service request transmitted by the NF consumer, wherein the service request comprises the identifier associated with the list of NF instances;
in response to receiving the service request selecting an NF instance from the list of NF instances; and
forwarding to the selected NF instance the service request received from the NF consumer.

20. A method at a service communication proxy (SCP), comprising:
the SCP receiving a first service entry request for triggering the SCP to create a service entry, wherein the first service entry request includes at least one parameter to build a context for the service entry, and wherein the SCP creates the service entry by establishing corresponding connections in advance and thereby preparing to receive external service requests;
in response to receiving the first service entry request, the SCP sending to a network repository function (NRF) a discovery request for discovering NF instances;
the SCP receiving a discovery response responsive to the discovery request, wherein the discovery response includes a list of the NF instances;
after receiving the discovery response, the SCP creating the service entry, wherein the service entry is associated with or includes the list of NF instances;
the SCP sending a first response to the first service entry request, wherein the first response includes a resource identifier for identifying the service entry;
after sending the first response to the first service entry request, the SCP receiving from a network function (NF) consumer a service request comprising the resource identifier;
in response to receiving the service request from the NF consumer, the SCP applying the service entry to process the service request; and
sending a first response to the first service entry request, wherein the first response includes a resource identifier for identifying the service entry.

* * * * *